US010936755B2

(12) United States Patent
Tseretopoulos et al.

(10) Patent No.: US 10,936,755 B2
(45) Date of Patent: *Mar. 2, 2021

(54) DEVICE LOCK BYPASS ON SELECTABLE ALERT

(71) Applicant: The Toronto-Dominion Bank, Toronto (CA)

(72) Inventors: Dean C. N. Tseretopoulos, Toronto (CA); Gregory Richard Harper, Toronto (CA); Sarabjit Singh Walia, Demarest, NJ (US); Sarir Nasim, Toronto (CA); Diane Lee, Toronto (CA); John Jong-Suk Lee, Toronto (CA); John William Thomas, Toronto (CA); Richard Thomas, Toronto (CA); Simona Heath, Toronto (CA)

(73) Assignee: The Toronto-Dominion Bank, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,715

(22) Filed: Aug. 1, 2019

(65) Prior Publication Data

US 2019/0354707 A1 Nov. 21, 2019

Related U.S. Application Data

(63) Continuation of application No. 15/618,524, filed on Jun. 9, 2017, now Pat. No. 10,410,017.
(Continued)

(51) Int. Cl.
*G06F 21/62* (2013.01)
*G06F 16/435* (2019.01)
(Continued)

(52) U.S. Cl.
CPC .......... *G06F 21/629* (2013.01); *G06F 3/0482* (2013.01); *G06F 3/0484* (2013.01);
(Continued)

(58) Field of Classification Search
CPC .... G06F 21/53; G06F 21/629; G06F 11/3089; G06F 11/3006; G06F 16/435;
(Continued)

(56) References Cited

U.S. PATENT DOCUMENTS 8,136,053 B1  3/2012  Miller et al.
8,342,392 B2  1/2013  Kiliccote
(Continued)

OTHER PUBLICATIONS

Christian Zibreg. "How to quickly access Wallet and Apple Pay on the Lock screen" Published Oct. 2, 2015 (15 pages) https://www.idownloadblog.com/2015/10/02/how-to-wallet-apple-pay-lock-screen/ (Year: 2015).*
(Continued)

*Primary Examiner* — Joseph P Hirl
*Assistant Examiner* — Thomas A Gyorfi
(74) *Attorney, Agent, or Firm* — Rowand LLP

(57) ABSTRACT

Methods and devices for generated and handling an alert are described. In one aspect, an electronic device includes an input interface and an output interface. The electronic device also includes a memory storing an application and a processor coupled to the input interface, the output interface and the memory. The processor is configured to generate a selectable alert on the output interface while the electronic device is in a device lock mode. The selectable alert is associated with the secure application. The processor is also configured to, while the electronic device is in the device lock mode, receive, from the input interface, a signal representing a command to activate the selectable alert. The processor is also configured to, responsive to receiving the
(Continued)

command to activate the selectable alert, execute a secure event in the secure application while the electronic device remains in the device lock mode.

20 Claims, 4 Drawing Sheets

Related U.S. Application Data

(60) Provisional application No. 62/402,529, filed on Sep. 30, 2016.

(51) Int. Cl.

| | | |
|---|---|---|
| *G06F 3/14* | (2006.01) | |
| *G06F 16/2458* | (2019.01) | |
| *G06F 16/93* | (2019.01) | |
| *G06Q 20/00* | (2012.01) | |
| *H04L 29/08* | (2006.01) | |
| *G06F 16/2455* | (2019.01) | |
| *G06F 11/30* | (2006.01) | |
| *G06F 3/0488* | (2013.01) | |
| *G06F 3/0484* | (2013.01) | |
| *G06Q 10/10* | (2012.01) | |
| *G06Q 10/08* | (2012.01) | |
| *G06Q 10/06* | (2012.01) | |
| *G06Q 20/14* | (2012.01) | |
| *G06Q 20/10* | (2012.01) | |
| *H04W 12/08* | (2009.01) | |
| *H04W 12/06* | (2009.01) | |
| *G06Q 20/38* | (2012.01) | |
| *G06Q 30/04* | (2012.01) | |
| *G06F 21/53* | (2013.01) | |
| *G06F 3/0482* | (2013.01) | |
| *G06F 16/23* | (2019.01) | |
| *G06Q 50/22* | (2018.01) | |

(52) U.S. Cl.
CPC ............ *G06F 3/0488* (2013.01); *G06F 3/14* (2013.01); *G06F 11/3006* (2013.01); *G06F 11/3089* (2013.01); *G06F 16/23* (2019.01); *G06F 16/2462* (2019.01); *G06F 16/24554* (2019.01); *G06F 16/435* (2019.01); *G06F 16/93* (2019.01); *G06F 21/53* (2013.01); *G06Q 10/06316* (2013.01); *G06Q 10/087* (2013.01); *G06Q 10/105* (2013.01); *G06Q 10/1097* (2013.01); *G06Q 20/00* (2013.01); *G06Q 20/102* (2013.01); *G06Q 20/14* (2013.01); *G06Q 20/38* (2013.01); *G06Q 30/04* (2013.01); *H04L 67/1097* (2013.01); *H04L 67/22* (2013.01); *H04W 12/06* (2013.01); *H04W 12/0806* (2019.01); *G06Q 50/22* (2013.01)

(58) Field of Classification Search
CPC ...... G06F 16/2462; G06F 16/93; G06F 16/23; G06F 16/24554; G06F 3/14; G06F 3/0488; G06F 3/0484; G06F 3/0482; G06Q 10/1097; G06Q 10/105; G06Q 10/087; G06Q 10/06316; G06Q 20/14; G06Q 20/102; G06Q 20/38; G06Q 30/04; G06Q 50/22; H04L 67/1097; H04L 67/22; H04W 12/08; H04W 12/06

See application file for complete search history.

(56) References Cited

U.S. PATENT DOCUMENTS

| | | |
|---|---|---|
| 8,532,628 B2 | 9/2013 | Kalinichenko et al. |
| 8,781,963 B1 | 7/2014 | Feng et al. |
| 8,923,827 B2 | 12/2014 | Wentker et al. |
| 9,230,259 B1 | 1/2016 | Tamassia et al. |
| 9,292,310 B2 | 3/2016 | Chaudhri et al. |
| 9,311,498 B2 | 4/2016 | Michalske |
| 9,390,414 B2 | 7/2016 | Wall et al. |
| 9,521,247 B2 | 12/2016 | Bandyopadhyay et al. |
| 9,898,642 B2 | 2/2018 | Han et al. |
| 2009/0287603 A1 | 11/2009 | Lamar et al. |
| 2010/0191602 A1 | 7/2010 | Mikkelsen et al. |
| 2012/0284297 A1 | 11/2012 | Aguera-Arcas et al. |
| 2013/0187753 A1 | 7/2013 | Chiriyankandath et al. |
| 2013/0297425 A1 | 11/2013 | Wallaja et al. |
| 2013/0345981 A1 | 12/2013 | van Os et al. |
| 2014/0267034 A1 | 9/2014 | Krulce et al. |
| 2014/0327518 A1 | 11/2014 | Loutit |
| 2015/0026057 A1 | 1/2015 | Calman et al. |
| 2015/0026623 A1 | 1/2015 | Horne |
| 2015/0371023 A1 | 3/2015 | Chen et al. |
| 2015/0163121 A1 | 6/2015 | Mahaffey et al. |
| 2015/0261948 A1 | 9/2015 | Marra et al. |
| 2015/0289821 A1 | 10/2015 | Rack-Gomer et al. |
| 2015/0350147 A1 | 12/2015 | Shepherd et al. |
| 2015/0379506 A1 | 12/2015 | Griffin |
| 2016/0037311 A1 | 2/2016 | Cho et al. |
| 2016/0044091 A1 | 2/2016 | Doumet |
| 2016/0071194 A1 | 3/2016 | Proulx et al. |
| 2016/0134737 A1 | 5/2016 | Pulletikurty et al. |
| 2016/0196419 A1 | 7/2016 | Kuscher |
| 2016/0219434 A1 | 7/2016 | Gren et al. |
| 2016/0239821 A1 | 8/2016 | Park et al. |
| 2016/0260084 A1 | 9/2016 | Main et al. |
| 2016/0353406 A1 | 12/2016 | Gianoukos et al. |
| 2016/0360382 A1 | 12/2016 | Gross et al. |
| 2016/0364600 A1 | 12/2016 | Shah et al. |
| 2017/0004482 A1 | 1/2017 | Mancini et al. |
| 2017/0024722 A1 | 1/2017 | Mhun et al. |
| 2017/0046496 A1 | 2/2017 | Johnstone et al. |
| 2017/0206351 A1 | 7/2017 | Jay et al. |

OTHER PUBLICATIONS http://bgr.com/2014/06/02/ios-8-actionable-notifications/, printed Jun. 8, 2017, The Most Jun. 8, 2017.
https://nrj.io/simple-interactive-notifications-in-ios-8/, printed Jun. 8, 2017, "Simple, Interactive Notifications in iOs 8" Jun. 8, 2017.
http://www.mindsea.com/2016/06/engage-users-actionable-notifications/, Jun. 2016, "Engage Users, Create Rich and Actionable Notifications" Jun. 2016.
USPTO, Office Action relating to U.S. Appl. No. 15/618,524 dated Apr. 19, 2019 Apr. 19, 2019.
CIPO, Examiner's Report relating to CA Application No. 2,970,088 dated Sep. 23, 2020.

\* cited by examiner

DEVICE LOCK BYPASS ON SELECTABLE ALERT

CROSS REFERENCE TO RELATED APPLICATIONS

The present application is a continuation of U.S. application Ser. No. 15/618,524 which was filed on Jun. 9, 2017 and which was a non-provisional of and claimed priority to U.S. application No. 62/402,529, which was filed on Sep. 30, 2016. The contents of these prior applications are hereby incorporated by reference in their entirety.

FIELD

The present application generally relates to alerts and reminders on electronic devices and, more particularly, to methods for handling selectable alerts on electronic devices.

BACKGROUND

Modern computing devices, such as smartphones and smartwatches, often display alerts and reminders on a display screen of such electronic devices. By way of example, alerts and reminders may be displayed upon occurrence of a trigger condition, such as at a specific time. Such alerts may be generated based on user input or generated based on other data. By way of example, an alert or reminder may be generated to remind a user of a scheduled meeting, to inform a user of a message that has been received, or to inform or remind the user of some other event or information.

When an alert or reminder is generated, a user may wish to take some action on their computing device in response to the alert or reminder. For example, some reminders may be dismissed or may be "snoozed" so that they are triggered again at some point in the future.

It would be helpful to provide more advanced interactions with reminders and alerts that allow users to easily address such reminders and alerts in more profound ways than simply dismissing or snoozing such reminders.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
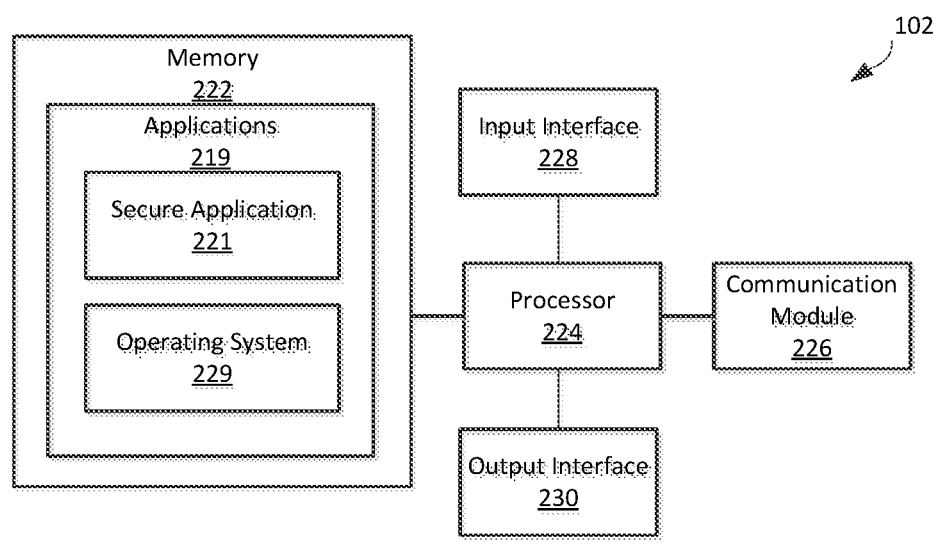
FIG. 1 is a block diagram of an example electronic device in accordance with example embodiments of the present disclosure.

In one aspect, the present application describes an electronic device. The electronic device includes an input interface and an output interface. The electronic device also includes a memory storing an application and a processor coupled to the input interface, the output interface and the memory. The processor is configured to generate a selectable alert on the output interface while the electronic device is in a device lock mode. The selectable alert is associated with the application. The processor is also configured to, while the electronic device is in the device lock mode, receive, from the input interface, a signal representing a command to activate the selectable alert. The processor is also configured to, responsive to receiving the command to activate the selectable alert, execute a secure event in the application while the electronic device remains in the device lock mode.

In another aspect, the present application describes a computer-implemented method. The method includes: i) generating a selectable alert on an output interface of an electronic device while the electronic device is in a device lock mode, the selectable alert associated with an application stored in memory of the electronic device; ii) receiving a signal representing an input command to activate the selectable alert via an input interface of the electronic device while the electronic device is in the device lock mode; and iii) responsive to receiving the command to activate the selectable alert, executing a secure event in the application while the electronic device remains in the device lock mode.

In another aspect, the present application describes a non-transitory computer readable storage medium storing computer-executable instructions which, when executed, cause a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Described herein are techniques for securely processing alerts while an electronic device is in a device lock mode. The device lock mode is a locked mode of operation in which a plurality of operations of the electronic device are unavailable. For example, when in the device lock mode, the electronic device may require input of device authorization information before transitioning to a normal operation mode of the electronic device. In the normal operating mode, the electronic device provides access to certain features that are unavailable in the device lock mode. By way of example, at least one of the following features may be available in the normal operating mode but not the device lock mode: display of a home screen (which may include a plurality of icons associated with a plurality of applications); access to user data or records on the electronic device; or access to one or more applications on the electronic device. The normal and locked operating modes are described in greater detail below.

The device authorization information that causes the electronic device to exit the device lock mode may be a password, personal identification number (PIN), or biometric data such as a fingerprint, retinal scan, or other biometric data. Other types of device authorization information may be used apart from the examples provided above.

As will be described herein, a selectable alert may be generated while the electronic device is in the device lock mode and, upon activation of the selectable alert, a secure event of an application associated with the selectable alert may be activated, bypassing an authentication stage which would otherwise be required to access the application from the device lock mode.

An overview having been provided, reference will now be made to FIG. 1 which illustrates a block diagram of an example electronic device 102 in accordance with an embodiment of the present application.

The electronic device 102 may be a computing device such as, for example, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), or any other type of computing device that may be configured to store data and software instructions, and execute software instructions to perform operations consistent with disclosed embodiments. In certain embodiments, the electronic devices may be associated with one or more users. For instance, a user may operate the electronic device, and may do so to cause the electronic devices to perform one or more operations consistent with the disclosed embodiments.

The example electronic device 102 includes at least one processor 224. The processor is coupled to a memory 222, a communication module 226 and device subsystems such as one more input interface 228 (which may include a keyboard, touchscreen, camera, fingerprint sensor, button, etc.), one or more output interface 230 (which may be a display, speaker, vibrator, etc.) and other device subsystems.

The communication module 226 may include subsystems for wired or wireless data communication. The communication module 226 allows the electronic device 102 to send and receive data such as electronic messages. For example, the communication module 226 may allow electronic messages to be sent and received over a network. Among other things, the communication module 226 may be used by the electronic device for communication with one or more servers such as, for example, a server that is associated with an application (such as a secure application) and that facilitates various operations of the application. By way of example, the communication module 226 may be used to send data to and receive data from a financial institution server such as a banking server. In at least some such embodiments, the financial institution server may provide back-end operations and functionality to a secure application 221 that is a banking application.

The memory 222 may include volatile and non-volatile memory. At least a part of the memory 222 may store processor-readable instructions that, when executed by the processor, cause the processor 224 to carry out some of the operations described herein. The processor-readable instructions may be provided in one or more applications 219. For example, an operating system 229 may control overall device operations.

The operating system 229 may configure the electronic device for various modes of operation including at least a normal operating mode (which may also be referred to as an unlocked mode) and a device lock mode of operation (which may also be referred to as a locked mode). More particularly, the operating system 229 configures the electronic device to operate in and to transition between locked and unlocked operating modes. For example, the operating system may configure the electronic device to transition from the normal operating mode to the device lock mode in response to the occurrence of a locking condition. The locking condition may, for example, require the electronic device to revert to the device lock mode after at least a predetermined period of time has lapsed since the last use of the electronic device. That is, the electronic device may timeout after a period of inactivity and, in so doing, may transition from the normal operating mode to the device lock mode. By way of further example, the device lock mode may be triggered in response to user input received via the input interface 228. For example, user input (such as a "lock device" command) may be received and, in response, the electronic device transitions to the device lock mode. By way of yet further example, the electronic device may transition to the device lock mode when the electronic device is powered on following a period in which it was powered off and/or following a reset of the electronic device. Other triggers may cause the electronic device to enter the device lock mode instead of or in addition to those noted above.

The normal operating mode differs from the device locked operating mode in that, in the normal operating mode certain features, operations or applications are available for use that are not available in the device lock mode. More particularly, the normal operating mode provides a larger set of features than are provided in the device lock mode. By way of example, the normal operating mode may enable outgoing telephone calls to be placed from the electronic device while the device lock mode may restrict or disable such calls. By way of further example, certain device applications may be unable to be executed when the electronic device is in the device lock mode. By way of yet further example, the device lock mode may not allow display of a device home screen (which may be a display screen containing a plurality of icons linking to various device applications 219) while the home screen may be displayed in the normal operating mode.

The operating system 229 may configure the electronic device to transition from the device lock mode to the normal operating mode upon receipt of valid device authorization information. More particularly, when the electronic device determines that valid device authorization information has been received via an input interface 228, it causes the electronic device to transition to the normal operating mode. The device authorization information may include any one or more of: a password, a personal identification number (PIN), biometric data such as a fingerprint data, facial data, or retinal data, security questions, or authorization information of other types. The validity of received device authorization information may be determined based on device authentication data (such as a stored password, PIN, or biometric profile), which may be stored securely in memory of the electronic device.

The applications 219 stored in the memory 222 may also include a secure application 221. The secure application 221 is an application that is configured to accept input of application authorization information to enable the use of one or more secure functions associated with the secure application 221. For example, the secure application 221 may allow a secure event to be executed after valid application authorization information has been input. The application authorization information is secure information that is used, by the secure application 221, to validate a user. By way of example, the application authorization information may include any one or more of: a password, a personal identification number (PIN), biometric data such as a fingerprint data, facial data, or retinal data, security questions, or authorization information of other types. The validity of received application authorization information may be determined based on application authentication data (such as a stored password, PIN, or biometric profile), which may be stored remotely. For example, the application authentication data may be stored at a financial institution server and the validity of received application authorization information may be assessed through communication with the financial institution server via the communication module 226. In at least some embodiments, the device authentication data (i.e., the data used to assess the validity of inputted device authorization information) may be different than the application authentication data (i.e., the data used to assess the validity of inputted application authorization information).

The term "secure application" as used herein, describes an application which has at least some secure features that may be unlocked through input of valid application authorization information. The "secure application" may also include other functions that do not require input of valid application authorization information for their use. By way of example, the secure application may perform background monitoring and alert-generation functions without input of valid application authorization information.

The secure application 221 may be selected for activation from within the normal operating mode of the electronic device and may, when activated within the normal operating mode, accept input of the application authorization information before certain secure features of the secure application 221 are accessible. For example, upon activation, the secure application 221 may display an authorization information request display screen (an example of which is displayed in FIG. 5), which is a display screen that prompts a user to input application authorization information via the input interface 228. Only when valid application authentication data is input will the secure application 221 provide access to certain features of the secure application 221.

As noted above, the secure application 221 may be a banking application. The banking application may include features associated with banking operations including for example, features to display account information (such as a current balance associated with an account, a list of recent transactions, a statement, bill payments information, transfer information, etc.) or to make a payment or transfer.

The secure application 221 may be a bill manager application or may be a banking application that includes bill manager functions. By way of example, bill manager functions may include any one or more of: monitoring communication messages for payment requests, generating, storing and/or maintaining a schedule of upcoming bill payments, processing bill payments, or other functions related to bill management.

One technique for allowing access to secure features of the secure application 221 would involve placing the electronic device in a normal operating mode (e.g., through input of valid device authorization information) if it is not already in the normal operating mode. After the electronic device is in the normal operating mode, the secure application 221 could then be selected for activation (e.g., by selecting an icon associated with the secure application 221 from a home screen of the operating system using an input interface 228). Then, when the application is running, the application may accept input of valid application authorization information before proceeding. After valid application authorization information is input, the full set of features of the secure application 221 may be available (including secure functions). If the secure application 221 is a banking application, for example, and is being accessed to pay a bill, a user might then navigate to a bill payment portion of the banking application and input relevant payment details to process a bill payment. Accessing the secure application in this way in order to, for example, pay a bill, requires numerous stages of user input. As will be described in greater detail below, a different mode of operation may be provided by the secure application 221 and/or the operating system 229 which allows at least some of these inputting operations to be bypassed.

As will be described in greater detail below with reference to FIG. 2, in some such embodiments, the electronic device may be configured to allow access to a secure event (such as a secure function) of the secure application 221 while the electronic device remains in a device lock mode. For example, the operating system may configure the electronic device to allow a user to access the secure event of the secure application 221 directly from a device lock screen, without requiring input of device authorization information which is otherwise required to unlock the electronic device. Further, at least some embodiments cause the secure application 221 to behave differently when accessed from the device lock screen than when accessed directly from a home screen.

Figure 2:
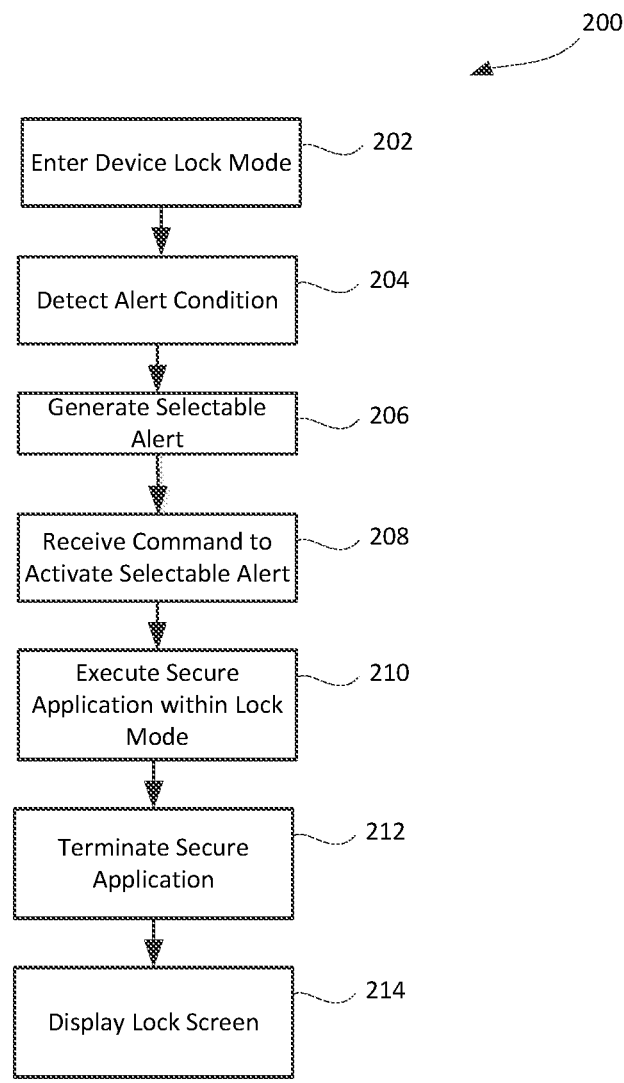
FIG. 2 is a flowchart of a method to access a secure event in an application directly while an electronic device is operating in a device lock mode in accordance with example embodiments of the present disclosure.

Reference will now be made to FIG. 2 which illustrates a flowchart of an example method 200 that may be performed by an electronic device 102 to access a secure event of an application directly while an electronic device is operating in a device lock mode. The method 200 may be performed by a processor 224 which executes processor-executable instructions stored in memory 222. The processor executable instructions may be provided in applications 219, including the operating system 229 and/or the secure application 221. For example, the operating system 229 and/or the secure application 221 may, when executed, configure the electronic device to perform the method 200.

At operation 202, the operating system 229 configures the electronic device to enter a device lock mode. The device lock mode, as noted above, is a locked mode of operation of the electronic device in which a plurality of operations of the electronic device are unavailable. The electronic device is configured to exit the device lock mode upon receipt of valid device authorization information input via an input interface of the electronic device. While not illustrated in FIG. 2, as noted above with reference to FIG. 1, upon exiting the device lock mode, the electronic device is configured to resume operation in a normal operating mode. In the normal operating mode, certain features that are not available in the device lock mode may be available. For example, the normal operating mode may allow a home screen to be displayed, may allow applications to be selected and launched from the home screen, etc.

While in the device lock mode, a device lock screen may be generated and may be displayed on a display of the electronic device 102. The device lock screen may, for example, display various notifications and alerts generated by the electronic device and may include other information such as, for example, time and date information.

While the electronic device 102 is in the device lock mode, at operation 204, it may detect an alert condition. The operating system 229 or the secure application 221 may cause the processor to detect the alert condition. The nature of the alert condition may vary but in at least some embodiments, the alert condition may be determined to have occurred when a new bill is determined to have arrived at the electronic device or when the current time satisfies criteria that has been defined in relation to a bill payment. For example, an alert condition may be determined to have occurred when a deadline for a bill payment draws near (e.g., when the current time is within a threshold of the deadline for payment) or when a user-defined time is the same as the current time (e.g., the user may define a date for a reminder and the alert condition may be generated on that date).

To detect the arrival of a new bill (or another alert condition), the secure application 221 and/or the operating system 229 may be configured to cause the electronic device to monitor communication messages received at the electronic device. For example, the electronic device may monitor received messages to determine whether a payment request has been received. The payment request may be an invoice, bill notification or a payment request of another type. The payment request may be identified, by the device, by text-based analysis techniques which may include, for example, natural language processing, keyword identification or other identification techniques. In analyzing communications to identify payment requests, the electronic device may identify payment information associated with such requests. Such payment information may include any one or more of the following: payee information (which may identify the name of the party requesting payment), total amount due information (which may identify a total amount owed in association with the payment), minimum amount due information (which may identify a minimum amount that the payer is required to pay in association with the payment), due date information (which may indicate a deadline for making payment), and/or account information (which may indicate an account number or other identifier associated with the payer). Other information may be identified instead of or in addition to the information noted above.

Accordingly, the alert condition that is determined to have occurred at operation 204 may be detected through the monitoring of communication messages received at the electronic device. In other embodiments, the alert condition may be detected by the secure application based on data associated with the secure application itself. For example, the secure application may identify a payment request from data associated with the secure application and may detect the alert condition based on the payment request. For example, the secure application may be a banking application that is configured to receive data from a financial institution server. At least some such data may specify payment information for a payment request. By way of example, the payment request may be a request to pay a credit card associated with the financial institution or the payment request may be a request to pay a bill of another type (e.g., a utility bill, a credit card associated with another provider, etc.). The payment request may specify payment information such as payee information, total amount due information, minimum amount due information, due date information and/or account information.

Figure 3:
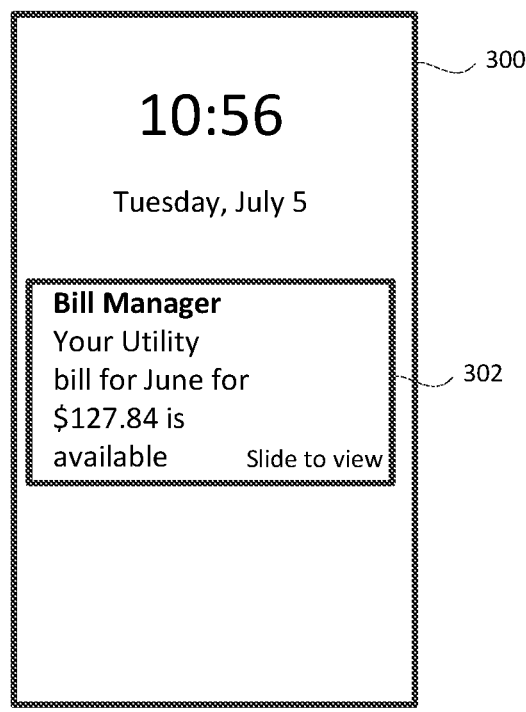
FIG. 3 is an example device lock screen that includes a selectable alert in accordance with example embodiments of the present disclosure.

At operation 206, the operating system 229 and/or the secure application 221 causes the electronic device to generate a selectable alert. The selectable alert is generated on an output interface while the electronic device is in a device lock mode. For example, the selectable alert may be generated on a device lock screen 300. Reference will briefly be made to FIG. 3 which illustrates an example selectable alert 302. In the example, the device lock screen 300 includes a selectable alert 302 which may be selected through user input on a touchscreen display. The selectable alert 302 is associated with a secure application and is, in the example, associated with a bill manager application which may be a standalone application or may be associated with another application such as a banking application. The selectable alert 302 is, in the example, a bill payment reminder and the selectable alert 302 is generated to include payment information which may be information identified at operation 204. In the example illustrated, the payment information includes total amount due information (e.g., $127.74) but other information may be displayed instead of or in addition to the total amount due information.

Figure 4:
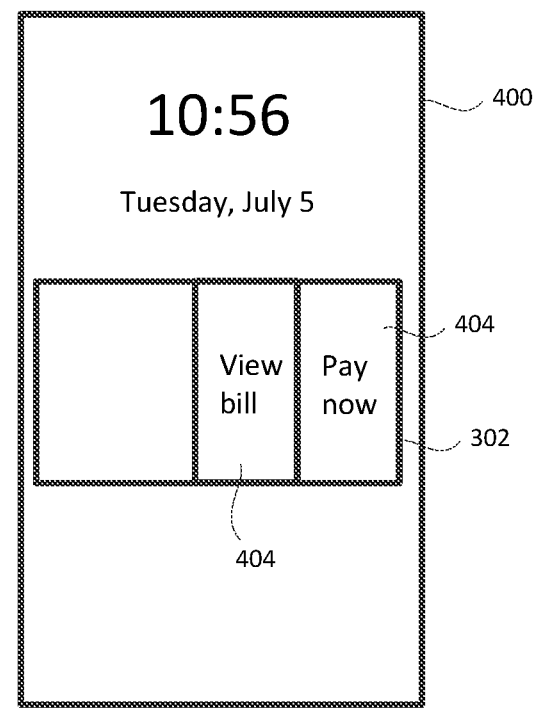
FIG. 4 is an example device lock screen that includes a selectable alert in accordance with example embodiments of the present disclosure.

In the example the selectable alert 302 is selectable through a slide gesture. However, the selectable alert 302 may be selected using other input techniques. When selected using the slide gesture (or another suitable gesture), a further device lock screen 400 may be generated. An example of a further device lock screen 400 is illustrated in FIG. 4. The further device lock screen 400 includes the selectable alert 302 but modifies its form. More particularly, the selectable alert 302 of FIG. 3 is modified in response to the swiping gesture so that the selectable alert 302 of FIG. 4 omits certain information previously displayed (such as payment information) and instead includes one or more action indicators 404. One or more of the action indicators 404 may be associated with a specific feature, operation or action of the secure application 221. In the example of FIG. 4, the selectable alert 302 includes two action indicators 404—a first action indicator is associated with a "view bill" feature of the secure application and a second action indicator is associated with a "pay now" features of the secure application. The "view bill" feature of the secure application is a feature to display particulars of a bill, such as for example, payment information of the type described above with reference to operation 204. The "pay now" feature is a feature to process a payment based on the bill. Other action indicators may be displayed in other embodiments instead of or in addition to the action indicators described above. By way of example, in some embodiments, the selectable alert includes "pay all" and "pay minimum" action indicators. The "pay all" action indicator is associated with a feature of the secure application that processes payment for the total amount due for a bill while the "pay minimum" action indicator is associated with a feature of the secure application that processes payment for the minimum amount due for a bill.

The action indicators 404 that are displayed for a selectable alert 302 may be based on the nature of the selectable alert and/or the nature of the alert condition that triggered the selectable alert. That is, selectable alerts of different types may include different options. For example, some bills may require payment in full and may not have an option to pay a lesser amount (i.e., they may not provide for a "minimum payment"). Thus, the method 200 of FIG. 2 may include, for example, determining one or more action indicators to be provided in association with the selectable alert. One or more of these action indicators may be selectively displayed based on the payment information described above (e.g., when the payment information includes a minimum payment amount, the "pay minimum" option may be displayed and where no minimum is specified no "pay minimum" action indicator is included).

Accordingly, in least some embodiments, the selectable alert 302 may be configured for multiple activation types. That is, the selectable alert may be configured to be activated in different ways. By way of example, in the example of FIG. 4 the selectable alert 302 may be activated to view a bill or it may be activated to pay a bill.

Referring again to FIG. 2, at operation 208, a command is received to activate the selectable alert 302. More particularly, while the electronic device is in the device lock mode, a signal representing a command to activate the selectable alert is received from the input interface. The command may be received, for example, through an action indicator 404 of the selectable alert. As noted above, the command may be of various types and may depend on the specific action indicator 404 that has been activated. For example, the command may be determined to be a "pay bill" input command when a "pay bill" action indicator is selected or it may be determined to be a "view bill" input command when a "view bill" action indicator is selected.

At operation 210, responsive to receiving the command to activate the selectable alert, the electronic device executes the secure event of the application while the electronic device remains in the device lock mode. For example, the electronic device may bypass device authentication information verification and may cause the secure event to be executed without first requiring input of the device authentication information since the secure application is configured to require input of application authorization information to enable use of one or more secure functions associated with the secure event. Thus, the electronic device may rely upon the secure application 221 itself to authenticate the user such that, at operation 210, the secure event is executed without input of the valid device authorization information for which the electronic device is configured to exit the device lock mode.

Figure 5:
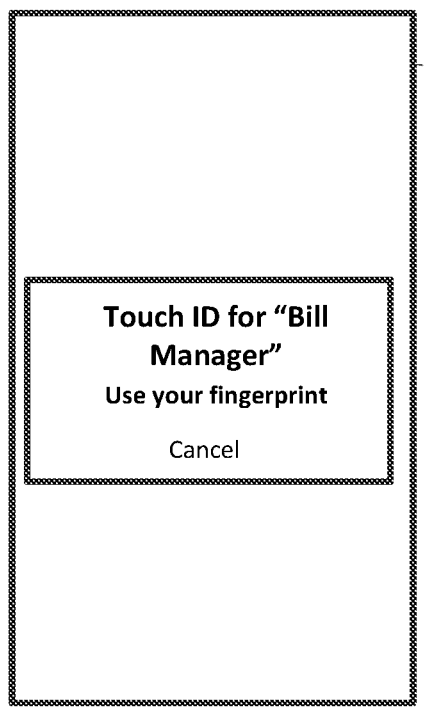
FIG. 5 is an example display screen that prompts for input of application authorization information in accordance with example embodiments of the present disclosure.

Accordingly, in response to receiving the command to activate the selectable alert, a display screen 500 may be generated to prompt for input of application authentication information. An example display screen 500 that prompts for user input of application authentication information is illustrated in FIG. 5. In the illustrated example, the display screen 500 prompts for input of a fingerprint via a fingerprint sensor.

When the secure event of the secure application 221 is executed through activation on the device lock screen, the secure application 221 may be executed differently than when activated via a home screen provided by the device's operating system. For example, since the device authentication information verification has been bypassed, the secure application 221 may be specially executed to ensure security of the electronic device is maintained. For example, when the secure application 221 is executed at operation 210, it may be executed in a sandboxed operating environment. The sandboxed operating environment may place restrictions on the secure application. For example, while in the sandboxed operating environment, the secure application may be prevented from accessing data associated with other applications stored in memory. For example, the secure application may be prevented from accessing user data such as contact records, browsing history, etc. The sandboxed operating environment may prevent execution of one or more user application stored in memory. That is, while the secure application is executed in the sandboxed operating environment, the device remains locked to prevent the user from accessing other applications. The user is provided with access to the secure application 221 but cannot access other applications. The electronic device remains in the device lock mode and access is only granted to the secure application associated with the selectable alert that was activated.

When the secure application is activated through activation of the selectable alert (e.g., by executing the secure event of the secure application), the secure application may be specially activated to reduce input required from a user. For example, the secure application may be activated to cause a function associated with the selectable alert to be automatically performed. The function that is performed when the secure event is executed may depend on the action indicator 404 that has been activated. For example, when the "pay bill" action indicator is activated, a bill payment screen or portal of the secure application may automatically be displayed. By way of further example, when the "view bill" action indicator is activated, an interface screen that allows a bill to be reviewed may be displayed. A specific feature of the secure application 221 may be immediately provided on activation of the secure application by calling the secure application with a parameter that activates that function.

In at least some embodiments, the secure application may be specially activated to prevent access to one or more functions that are not the function associated with the actionable alert. For example, certain features of the secure application that are not associated with the function for the selected selectable alert may be locked. Thus, the secure event may be an event that allows access to certain features of the secure application but that prevents access to certain other features of the secure application. Alternatively, the secure event may allow all features of the secure application but may simply require a per-use authentication.

Further, when the secure event is executed through activation of the selectable alert, the secure application may use information associated with the selectable alert to automatically configure a feature or operation of the secure application. By way of example, payment information that was associated with a selectable alert may be used by the electronic device to automatically configure a bill payment. For example, payee information, payment amount information, etc. may automatically be configured for a bill payment so that a user does not have to specifically define such information.

Figure 6:
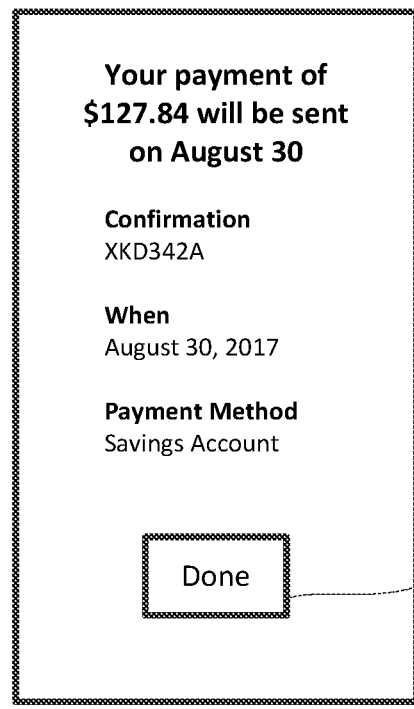
FIG. 6 is an example payment confirmation screen in accordance with example embodiments of the present disclosure.

In some embodiments, in response to activation of a "pay bill" action indicator of the selectable action, a bill payment may automatically be performed without further input (apart from the application authorization information). That is, the bill payment will automatically be made through communication with a financial institution server without further input specifying payment conditions and parameters. In such embodiments, a payment confirmation screen 600 (FIG. 6) may automatically be displayed following the payment. This payment confirmation screen 600 may include a selectable option 602 to terminate the secure application.

In other embodiments, the electronic device may be configured to allow a user to configure a payment prior to actual submission of the payment. In such embodiments, after application authorization information is verified, the secure application may automatically display a bill payment screen which may be pre-configured with expected conditions and parameters. The conditions and parameters may be configured based on default information stored in memory and/or based on payment information associated with the selectable action. By way of example, a payment amount and a payee may be configured based on such payment information. The user may be permitted to modify at least some of the conditions and parameters prior to submission of the payment. After submission, a payment confirmation screen 600 may be displayed.

Since the electronic device 102 remains in the device lock mode while the secure event is executed, when the secure event is terminated (at operation 212) or the secure application is exited, a device lock screen associated with the device lock mode may be automatically displayed at operation 214. That is, responsive to termination of the secure application or the secure event, the device lock screen is displayed. For example, when a request to exit the application is received (e.g., through selection of a "home" or "exit" button), operation resumes at the device lock screen and not the home screen of the operating system that is viewable in the normal operating mode of the electronic device 102. The selectable alert may be removed from the display screen if it is determined to be no longer relevant (e.g., if a bill associated with the selectable alert has now been paid).

It will be noted that at least some embodiments described herein allow a bill payment to be processed from a device lock screen when an electronic device is in a device lock mode without having to input authentication information twice. This achieves a number of technical benefits, including, for example, reducing processor usage and reducing associated power usage), all while ensuring securing on the electronic device.

Modifications may be made to the above-referenced methods. For example, in some embodiments, at operation 210, instead of bypassing the inputting of device authorization information, the electronic device may bypass the inputting of application authorization information and may only require the input of the valid device authorization information.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. An electronic device comprising:
an input interface;
an output interface;
memory storing a secure application; and
a processor coupled to the input interface, the output interface and the memory, the processor configured to:
generate a selectable alert on the output interface while the electronic device is in a device lock mode, the selectable alert associated with the secure application;
while the electronic device is in the device lock mode, receive, via the input interface, a signal representing a command to activate the selectable alert; and
responsive to receiving the command to activate the selectable alert:
prompt for input of application authentication information associated with the secure application; and
responsive to receiving, via the input interface, the input of application authentication information, cause the secure event to be executed in the secure application while the electronic device remains in the device lock mode.

2. The electronic device of claim 1, wherein causing the secure event to be executed in the secure application while the electronic device remains in the device lock mode comprises causing the secure application to be executed in a sandboxed operating environment.

3. The electronic device of claim 2, wherein the sandboxed operating environment prevents the secure application from accessing data associated with other applications stored in the memory.

4. The electronic device of claim 2, wherein the sandboxed operating environment prevents execution of at least one user application stored in the memory and wherein the at least one user application is not the secure application for which the secure event is executed.

5. The electronic device of claim 1, wherein the processor is further configured to:
responsive to termination of the secure event, display a device lock screen associated with the device lock mode.

6. The electronic device of claim 1, wherein causing the secure event to be executed in the secure application while the electronic device remains in the device lock mode comprises causing the secure event to be executed in the secure application without input of valid device authorization information for which the electronic device is configured to exit the device lock mode.

7. The electronic device of claim 1, wherein the secure application is configured to accept input of application authorization information to enable use of one or more secure functions associated with the secure application.

8. The electronic device of claim 7, wherein the secure application includes a financial application.

9. The electronic device of claim 1, wherein the secure application includes a banking application, and wherein the selectable alert includes one of a bill payment reminder, bill payment information, a display of account information, a list of one or more recent transactions, an account statement, and payment or transfer information.

10. The electronic device of claim 1, wherein causing the secure event to be executed in the secure application while the electronic device remains in the device lock mode comprises calling the secure application with a parameter that activates a function associated with the selectable alert.

11. The electronic device of claim 10, wherein causing the secure event to be executed in the secure application while the electronic device remains in the device lock mode further comprises executing the secure application to prevent access to one or more functions that are not the function associated with the selectable alert.

12. A computer-implemented method comprising:
generating a selectable alert on an output interface of an electronic device while the electronic device is in a device lock mode, the selectable alert associated with a secure application stored in memory of the electronic device;
receiving a signal representing an input command to activate the selectable alert via an input interface of the electronic device while the electronic device is in the device lock mode; and responsive to receiving the command to activate the selectable alert:
prompting for input of application authentication information associated with the secure application; and
responsive to receiving the input of application authentication information, causing the secure event to be executed in the secure application while the electronic device remains in the device lock mode.

13. The computer-implemented method of claim 12, wherein causing the secure event to be executed in the secure application while the electronic device remains in the device lock mode comprises causing the secure application to be executed in a sandboxed operating environment.

14. The computer-implemented method of claim 13, wherein the sandboxed operating environment prevents the secure application from accessing data associated with other applications stored on the electronic device.

15. The computer-implemented method of claim 13, wherein the sandboxed operating environment prevents execution of other user applications that are not the secure application for which the secure event is executed.

16. The computer-implemented method of claim 12, further comprising:
responsive to termination of the secure event, displaying a device lock screen associated with the device lock mode.

17. The computer-implemented method of claim 12, wherein causing the secure event to be executed in the secure application while the electronic device remains in the device lock mode comprises causing the secure event to be executed in the secure application without input of valid authorization information for which the electronic device is configured to exit the device lock mode.

18. The computer-implemented method of claim 12, wherein the secure application is configured to accept input of application authorization information to enable use of one or more secure functions associated with the secure application.

19. A non-transitory computer readable storage medium comprising computer-executable instructions which, when executed, configure a processor to:
generate a selectable alert on an output interface of an electronic device while the electronic device is in a device lock mode, the selectable alert associated with a secure application stored in memory of the electronic device;
receive a signal representing an input command to activate the selectable alert via an input interface of the electronic device while the electronic device is in the device lock mode; and
responsive to receiving the command to activate the selectable alert:
prompt for input of application authentication information associated with the secure application; and
responsive to receiving the input of application authentication information, cause the secure event to be executed in the secure application while the electronic device remains in the device lock mode.

20. The non-transitory computer readable storage medium comprising computer-executable instructions of claim 19, wherein the secure application includes a banking application, and wherein the selectable alert includes one of a bill payment reminder, bill payment information, a display of account information, a list of one or more recent transactions, an account statement, and payment or transfer information.

* * * * *